June 3, 1969  R. H. BRUNTON III  3,448,414
FAST RECOVERY SWITCH LIMITER CIRCUIT
Filed May 16, 1967

INVENTOR.
ROBERT H. BRUNTON III.

BY Harry M. Saragovitz
Edward J. Kelly, Herbert Berl
& Julian C. Keppler
ATTORNEYS

United States Patent Office 3,448,414
Patented June 3, 1969

3,448,414
FAST RECOVERY SWITCH LIMITER CIRCUIT
Robert H. Brunton III, West Acton, Mass., assignor, by mesne assignments, to the United States of America as represented by the Secretary of the Army
Filed May 16, 1967, Ser. No. 640,443
Int. Cl. H01p 1/10
U.S. Cl. 333—98                                 3 Claims

ABSTRACT OF THE DISCLOSURE

A fast recovery overload protection switch for a microwave system including a variable capacitance semiconductor circuit responsive to power pulses greater than a predetermined level. Upon the discharge of the stored charge on the capacitive circuit through an inductive discharge path, the resonance of the tuned cavity is detuned thus protecting the sensitive crystals within the microwave system.

BACKGROUND OF THE INVENTION

The present invention relates generally to overload protection circuitry for microwave systems and more particularly to a fast recovery TR–ATR switch limiter which offers virtually constant protection to the system components during all phases of operation.

In the field of radar, it has been the general practice to employ a protective device called a duplexer or TR network for coupling the transmitter and receiver to the antenna in order to protect the receiver from damage during operation of the transmitter. Conventional TR devices suffer from the disadvantage that they do not respond instantly to the transmitted pulse, such that a short high power pulse is allowed to pass therethrough. This pulse or spike may cause serious damage to the critically tuned elements and highly sensitive crystal detectors and mixers of the receiver. This problem has been somewhat alleviated by the use of an auxiliary TR network which typically consists of a gas tube across the waveguide which ionizes when the power reaches a certain level, placing a short on the line and reflecting the power back to the TR away from the receiver. Variable reactance solid state diodes may be utilized in place of the gas tub. Diodes of this type have a capacity across their terminals that varies with the applied voltage. Leakage from the TR to the ATR greatly increases the capacity of the diodes and detunes the waveguide cavity to such an extent that little power is passed to the receiver.

In the case of short range radar systems, the deionization time of the gas tube renders the receiver sensitivity very low for a few microseconds following each transmitted pulse such that the minimum usable range of the radar would be of the order of 2,000 feet. Where variable reactance diodes, such as the PIN type, are utilized to detune the cavity in place of the gas tube arrangement, low sensitivity of the receiver is again encountered as the result of the slow carrier recombination rate of the intrinsic layer in the PIN diodes.

SUMMARY OF THE INVENTION

It is the general purpose of this invention to provide a fast recovery TR–ATR switch limiter for a microwave system which embraces all the advantages of similarly employed overload protection circuits but possesses none of the aforedescribed disadvantages. To attain this, the present invention contemplates a unique arrangement of variable reactance solid state diodes with an inductive discharge path for the stored carriers in the diodes for removing the charge extremely fast and sweeping out the stored carriers to enhance the recovery time thereof.

BRIEF DESCRIPTION OF THE DRAWING

The exact nature of this invention will be readily apparent from consideration of the following specification relating to the annexed drawing in which.

DESCRIPTION OF THE PREFERRED EMBODIMENT

Figure 1:
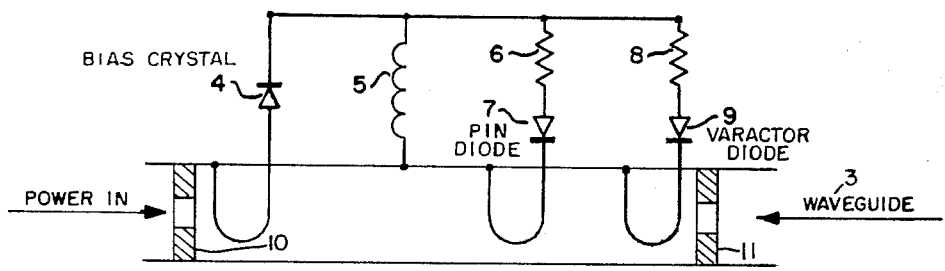
FIGURE 1 shows one embodiment of the fast recovery variable reactance solid state microwave protection circuit of the instant invention.
Figure 2:
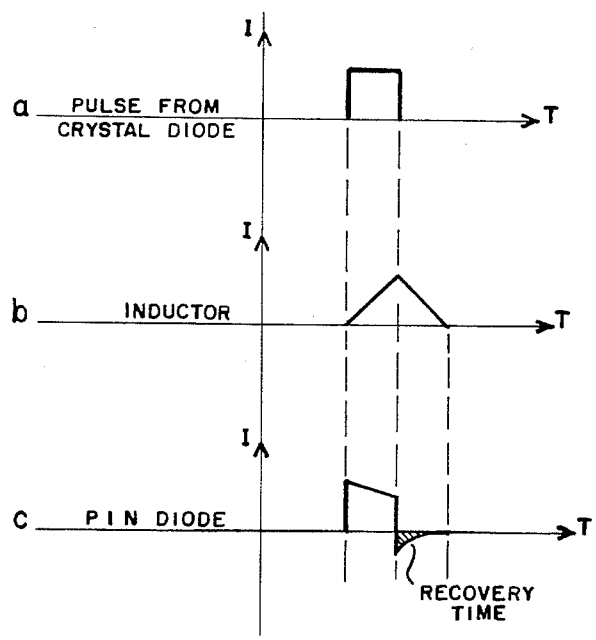
FIGURES 2a, 2b, and 2c illustrate typical waveform characteristics of the recovery time of the circuit employed in FIGURE 1.

Referring now to the drawing, FIGURE 1 shows a waveguide 3 representative of a resonant cavity within an auxiliary TR. Within the resonant cavity defined by irises 10 and 11 is an overload protection circuit having a crystal detecting diode 4 responsive to incident power pulses. Upon the detection of a power pulse sufficient to bias crystal diode 4 into conduction, a current pulse is produced which places both PIN diode 7 and varactor diode 9 into a state of forward conduction. FIGURE 2a represents the forward biasing pulse initiated by diode 4 upon the detection of an incident power pulse in the order of 1 kw. with a duration of approximately 1.0 microsecond. Both diodes 7 and 9 are biased for forward conduction for the duration of the current pulse and at termination of the pulse, which corresponds to the turn-off of diode 4, conduction in neither diode 7 nor 9 is immediately extinguished due to the capacitive characteristics thereof. The charge built up on the diodes must be dissipated before the circuit will respond to subsequent input pulses. Even with a low resistive discharge path for the diodes, recovery time would be in the order of 2 to 5 microseconds, which would be grossly inadequate for short range radar systems desired to be used within a 500 foot range. The inductive discharge path of FIGURE 1 provides for greatly improved results, such as a recovery time of approximately 200 nanoseconds.

PIN diode 7 is a double diffused silicon junction diode with an intrinsic layer separating the P and N regions. When the PIN diode is placed in a state of forward conduction by the bias crystal current pulse, carriers are injected into the intrinsic layer from both the P and N regions. When the bias current pulse is terminated, carrier recombination does not occur due to the presence of carriers stored in the intrinsic layer of the diode. This carrier storage is minimized in varactor diode 9 since it does not have an intrinsic layer and carrier diffusion is thereby extremely rapid.

The PIN diode 7 appears as a charged capacitor and is provided with a discharge path through inductor 5. The field of the inductor is energized during the bias current pulse and at termination of the bias current pulse there is still a finite current flowing in the inductor. At the instant of bias turn off the collapse of the inductor field causes a reversal of current flow through the PIN and varactor diodes (FIGURE 2b) which removes the charge in PIN diode 7 extremely fast to thereby enhance the recovery time of the circuit (FIGURE 2c).

The value of inductance must be chosen such that a sufficient forward bias is maintained during the bias pulse period. The smallest value of inductance is thereby determined for optimum circuit performance. Typical values for the circuit parameters of FIGURE 1 would be $L=100\ \mu h.$, $R6=10\Omega$ and $R8=22\Omega$. These values are given for illustrative purposes only and are not to be construed as limiting.

It should be understood, of course, that the foregoing disclosure relates to only a preferred embodiment of the invention and that numerous modifications or alterations 1. In an overload protection circuit for a microwave system:
   a tunable cavity resonator having a predetermined resonant frequency,
   a variable capacitance circuit positioned within said cavity resonator,
   an overload detector positioned within said cavity resonator for sensing incident high power pulses and for impressing a bias across said variable capacitance circuit, whereby automatic detuning of said resonant cavity occurs upon a change in capacitance of said capacitive circuit, and
   an inductive discharge path for said variable capacitance circuit for quickly dissipating all stored charge therein and for rendering the protection circuit responsive to subsequently detected high power pulses of a magnitude greater than a predetermined safe level.

2. An overload protection circuit as set forth in claim 1 where the variable capacitance circuit positioned within the cavity resonator comprises a PIN diode and a varactor diode connected in parallel across the cavity.

3. The apparatus as set forth in claim 2 wherein said inductive discharge path for said variable capacitance circuit comprises an inductance coil.

References Cited

UNITED STATES PATENTS 3,174,119   3/1965   Jones _____ 333—13

HERMAN KARL SAALBACH, *Primary Examiner.*

L. ALLAHUT, *Assistant Examiner.*

U.S. Cl. X.R.

307—237, 320; 333—17